(12) United States Patent
Mori (10) Patent No.: US 10,720,816 B2
(45) Date of Patent: Jul. 21, 2020

(54) LAMINATED CORE MANUFACTURING METHOD, INNER CORE, AND OUTER CORE

(71) Applicant: Yoshikawa Kogyo Co., Ltd., Fukuoka (JP)

(72) Inventor: Yuji Mori, Fukuoka (JP)

(73) Assignee: Yoshikawa Kogyo Co., Ltd., Fukuoka (JP)

( * ) Notice: Subject to any disclaimer, the term of this patent is extended or adjusted under 35 U.S.C. 154(b) by 0 days.

(21) Appl. No.: 15/781,552

(22) PCT Filed: Dec. 6, 2016

(86) PCT No.: PCT/JP2016/086146
§ 371 (c)(1),
(2) Date: Jun. 5, 2018

(87) PCT Pub. No.: WO2017/099048
PCT Pub. Date: Jun. 15, 2017

(65) Prior Publication Data
US 2018/0367016 A1   Dec. 20, 2018

(30) Foreign Application Priority Data
Dec. 7, 2015   (JP) .................. 2015-238259

(51) Int. Cl.
*H02K 15/12*   (2006.01)
*H02K 15/02*   (2006.01)
(Continued)

(52) U.S. Cl.
CPC .............. *H02K 15/12* (2013.01); *H01F 3/04* (2013.01); *H02K 1/185* (2013.01); *H02K 1/276* (2013.01);
(Continued)

(58) Field of Classification Search
CPC ........ H02K 15/12; H02K 15/02; H02K 15/03; H02K 1/276; H02K 1/2766; B29C 65/54;
(Continued)

(56) References Cited

U.S. PATENT DOCUMENTS 3,299,304 A   1/1967   Hull
3,512,902 A   5/1970   Emmons et al.
(Continued)

FOREIGN PATENT DOCUMENTS

CN   102097901 B   4/2013
JP   54160446 A * 12/1979
(Continued)

OTHER PUBLICATIONS

Machine translation of JP 2015-142453 date unknown.*
(Continued)

*Primary Examiner* — John L Goff, II
(74) *Attorney, Agent, or Firm* — Millen, White, Zelano & Branigan, P.C.; William Nixon (57) ABSTRACT

Provided is a method of manufacturing a laminated core for stably fixing a thin core piece while suppressing reduction in production efficiency, and an inner core and an outer core with core pieces stably fixed. A method of manufacturing a laminated core for manufacturing an inner core 10 includes: a step A of laminating a plurality of core pieces 11 and temporarily fixing each of the core pieces to another core piece 11 to obtain a core piece group 16; a step B of fitting the core piece group 16 to a holder 17; a step C of applying an uncured curable resin P to an outer peripheral region of the core piece group 16; and a step D of curing the curable resin P applied to the core piece group 16 and fully fixing each of the core pieces 11 to another core piece 11.

12 Claims, 9 Drawing Sheets

(51) Int. Cl.
  *H02K 1/18* (2006.01)
  *H02K 1/27* (2006.01)
  *H01F 3/04* (2006.01)
  *H02K 15/03* (2006.01)

(52) U.S. Cl.
  CPC ........... *H02K 1/2766* (2013.01); *H02K 15/02* (2013.01); *H02K 15/03* (2013.01); *H02K 2213/03* (2013.01)

(58) Field of Classification Search
  CPC ... B29C 65/542; B29C 65/544; B29C 65/546; B29C 65/548
  USPC ......................................................... 156/305
  See application file for complete search history.

(56) References Cited

U.S. PATENT DOCUMENTS 3,620,885 A * 11/1971 Schlaudroff ......... H02K 15/024
  156/563
5,052,332 A * 10/1991 Hajek ....................... B05C 9/10
  118/72
2015/0288263 A1  10/2015 Aoki et al.

FOREIGN PATENT DOCUMENTS

| JP | 2006-14560 A | 1/2006 |
| JP | 2013-48555 A | 3/2013 |
| JP | 5527538 B2 | 4/2014 |
| JP | 2015-142453 A | 8/2015 |

OTHER PUBLICATIONS

Machine translation of JP 54-160446 date unknown.*
International Search Report dated Mar. 14, 2017 issued in corresponding PCT/JP2016/086146 application (3 pages).
English Machine Translation of JP 55-27538 B2 published Apr. 25, 2014.
English Abstract of JP 2006-014560 A published Jan. 12, 2006.
English Abstract of JP 2013-048555 A published Mar. 7, 2013.
English Abstract of JP 2015-142453 A published Aug. 3, 2015.

* cited by examiner

LAMINATED CORE MANUFACTURING METHOD, INNER CORE, AND OUTER CORE

TECHNICAL FIELD

The present invention relates to a method of manufacturing a laminated core formed by laminating core pieces, an inner core, and an outer core.

BACKGROUND ART

In a laminated core (inner core or outer core) formed by laminating a plurality of core pieces, each core piece is fixed by caulking or with an adhesive. Specific examples of fixation by caulking and specific examples of fixation with an adhesive are described in, for example, Patent Documents 1 and 2.

RELATED ART DOCUMENTS

Patent Documents

Patent Document 1 JP 2006-14560 A
Patent Document 2 JP 2013-48555 A

SUMMARY OF THE INVENTION

Problems to be Solved by the Invention

Although caulking can stably fix core pieces having a certain thickness (for example, thickness exceeding 200 μm), there is a problem that a thin core piece (for example, a thickness of 200 μm or less) is unable to be stably fixed. Even by fixation with an adhesive described in Patent Document 2, a predetermined amount of the adhesive is unable to be stably applied to a predetermined region of a core piece, and a thin core piece is not surely fixed. As a method of fixing using an adhesive, there is a method in which laminated core pieces are vacuum pressed and an adhesive is applied, which is problematic in that production efficiency is poor because vacuum pressurization is required.

The present invention has been made in view of such circumstances, and an object thereof is to provide a method of manufacturing a laminated core for stably fixing a thin core piece while suppressing reduction in production efficiency, and an inner core and an outer core with core pieces stably fixed.

Means for Solving the Problems

A method of manufacturing a laminated core according to a first aspect of the present invention in line with the above-described object is a method of manufacturing a laminated core for manufacturing an inner core, including: a step A of laminating a plurality of core pieces and temporarily fixing each of the core pieces to another core piece to obtain a core piece group; a step B of fitting the core piece group to a holder; a step C of applying an uncured curable resin to an outer peripheral region of the core piece group; and a step D of curing the curable resin applied to the core piece group and fully fixing each of the core pieces to another core piece.

In the method of manufacturing a laminated core according to the first aspect of the present invention, preferably, application of the curable resin in the step C is performed by rotating the core piece group around an axial center in a state in which a part of the outer peripheral region is immersed in a resin reservoir containing the uncured curable resin.

In the method of manufacturing a laminated core according to the first aspect of the present invention, preferably, the holder includes a holding member penetrating the axial center of the core piece group, and rotation of the core piece group in the step C is performed in a state in which the holding member is not immersed in the resin reservoir.

In the method of manufacturing a laminated core according to the first aspect of the present invention, preferably, application of the curable resin in the step C is performed by bringing a resin-attached body having the uncured curable resin to the outer peripheral region of the core piece group.

In the method of manufacturing a laminated core according to the first aspect of the present invention, preferably, application of the curable resin in the step C is performed by spraying the uncured curable resin on the outer peripheral region of the core piece group.

In the method of manufacturing a laminated core according to the first aspect of the present invention, preferably, before the step D, a part of the curable resin applied to the core piece group is removed by rotating the core piece group.

In the method of manufacturing a laminated core according to the first aspect of the present invention, preferably, a region of the core piece group on which the curable resin is applied is cleaned during the steps B and C.

A method of manufacturing a laminated core according to a second aspect of the present invention in line with the above-described object is a method of manufacturing a laminated core for manufacturing an outer core, including: a step E of laminating a plurality of core pieces and temporarily fixing each of the core pieces to another core piece to obtain a core piece group; a step F of fitting the core piece group to a holder; a step G of applying an uncured curable resin to an inner peripheral region of the core piece group; and a step H of curing the curable resin applied to the core piece group and fully fixing each of the core pieces to another core piece.

In the method of manufacturing a laminated core according to the second aspect of the present invention, preferably, application of the curable resin in the step G is performed by bringing a resin-attached body having the uncured curable resin to the inner peripheral region of the core piece group.

In the method of manufacturing a laminated core according to the second aspect of the present invention, preferably, application of the curable resin in the step C is performed by spraying the uncured curable resin on the inner peripheral region of the core piece group.

In the method of manufacturing a laminated core according to the first and second aspects of the present invention, preferably, a plurality of the core piece groups are fitted to the holder in a state in which the core piece groups are arranged coaxially with spacers arranged between adjacent core piece groups.

In the method of manufacturing a laminated core according to the first and second aspects of the present invention, preferably, the holder includes a fixing member that clamps the plurality of core piece groups fitted to the holder from both sides.

In the method of manufacturing a laminated core according to the first and second aspects of the present invention, preferably, the curable resin is a thermosetting resin.

An inner core according to a third aspect of the present invention in line with the above-described object is an inner core wherein the radially outer side of each of the core pieces is adhered to another core piece by a curable resin, and a region where the cured curable resin is absent is provided on the radially inner side of each of the core pieces.

In the inner core according to the third aspect of the present invention, preferably, the thickness of the core piece is 200 μm or less.

In the inner core according to the third aspect of the present invention, preferably, the inner core is a stator, and a caulking portion is provided in a non-extension region of a teeth in a central annular portion of each of the core pieces.

In the inner core according to the third aspect of the present invention, preferably, the inner core is a rotor, and the distance from a magnet insertion hole to the outer periphery is from 0.05 to 0.4 μm.

An outer core according to a fourth aspect of the present invention in line with the above-described object is an outer core obtained by laminating a plurality of core pieces, wherein the radially inner side of each of the core pieces is adhered to another core piece by a curable resin, and a region where the cured curable resin is absent is provided on the radially outer side of each of the core pieces.

In the outer core according a forth aspect of the present invention, preferably, the thickness of the core piece is 200 μm or less.

In the outer core according a forth aspect of the present invention, preferably, the outer core is an annular rotor, and the distance from a magnet insertion hole to the inner periphery is from 0.05 to 0.4 μm.

Effects of the Invention

In the method of manufacturing a laminated core according to the first aspect of the present invention, since the uncured curable resin is applied to the outer peripheral region of the core piece group in which the plurality of core pieces are laminated and temporarily fixed to the other core pieces, and the applied curable resin is cured, it is possible to stably fix a thin core piece while suppressing a decrease in production efficiency.

In the method of manufacturing a laminated core according to the second aspect of the present invention, an uncured curable resin is applied to the inner peripheral region of a core piece group obtained by laminating a plurality of core pieces and temporarily fixing each of the core pieces to another core piece, and the applied curable resin is cured, and therefore, it is possible to stably fix even a thin core piece while suppressing reduction in production efficiency.

In the inner core according to the third aspect of the present invention, since both sides of the core piece is adhered to another core piece by a curable resin on the outside in the radial direction, the core pieces are stably adhered to each other. In the outer core according to the fourth aspect of the present invention, since both sides of the core piece are adhered to another core piece by a curable resin on the inner side in the radial direction, the core pieces are stably adhered to each other.

MODE FOR CARRYING OUT THE INVENTION

Embodiments embodying the present invention will now be described with reference to the accompanying drawings for understanding of the present invention.

Figure 1:
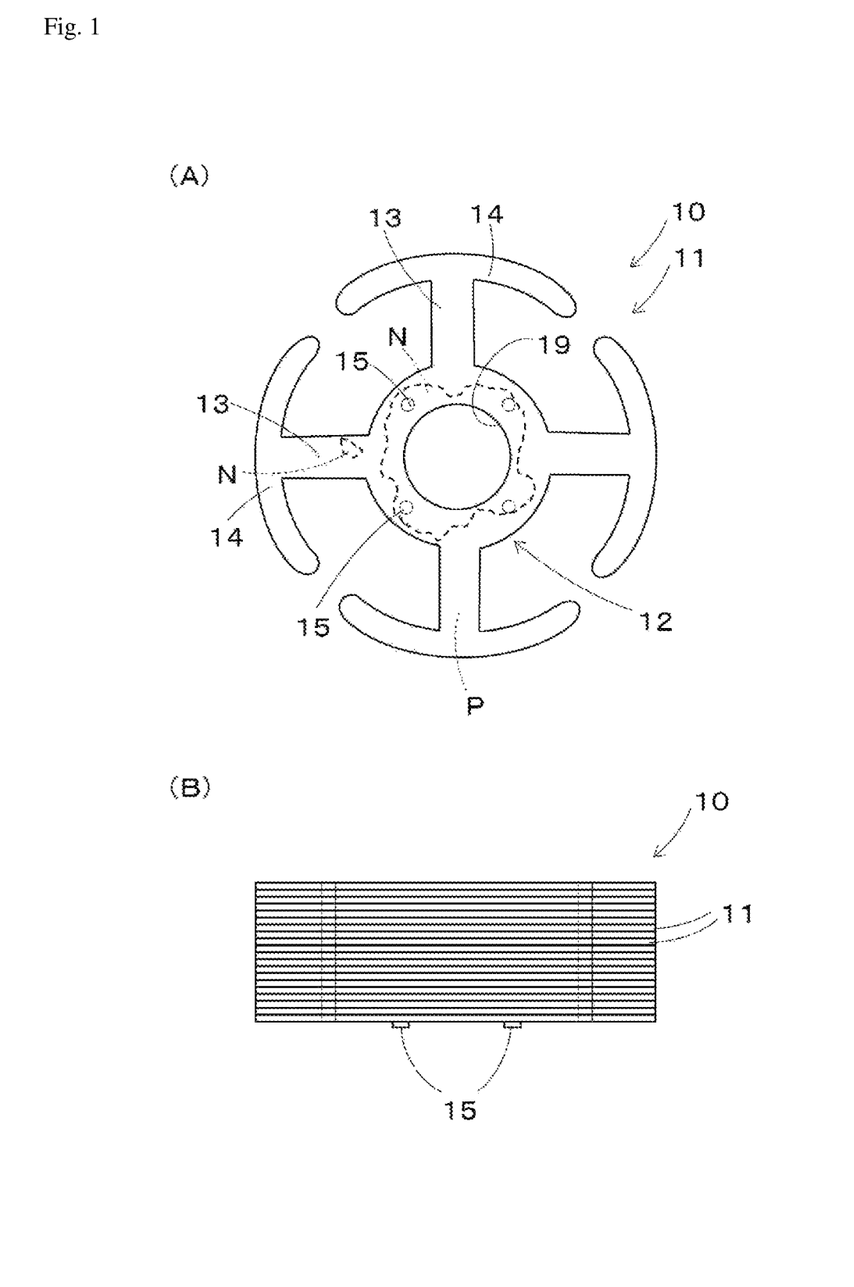
FIGS. 1A and 1B are a plan view and a side view of an inner core manufactured by a method of manufacturing a laminated core according to a first embodiment of the present invention, respectively.

An inner core 10 manufactured by the method of manufacturing a laminated core according to the first embodiment of the present invention (hereinafter, also referred to as "method of manufacturing the first laminated core") is a stator which is formed by laminating a predetermined number of core pieces 11 as shown in FIGS. 1A and 1B, and which is used together with an outer rotor.

Figure 2:
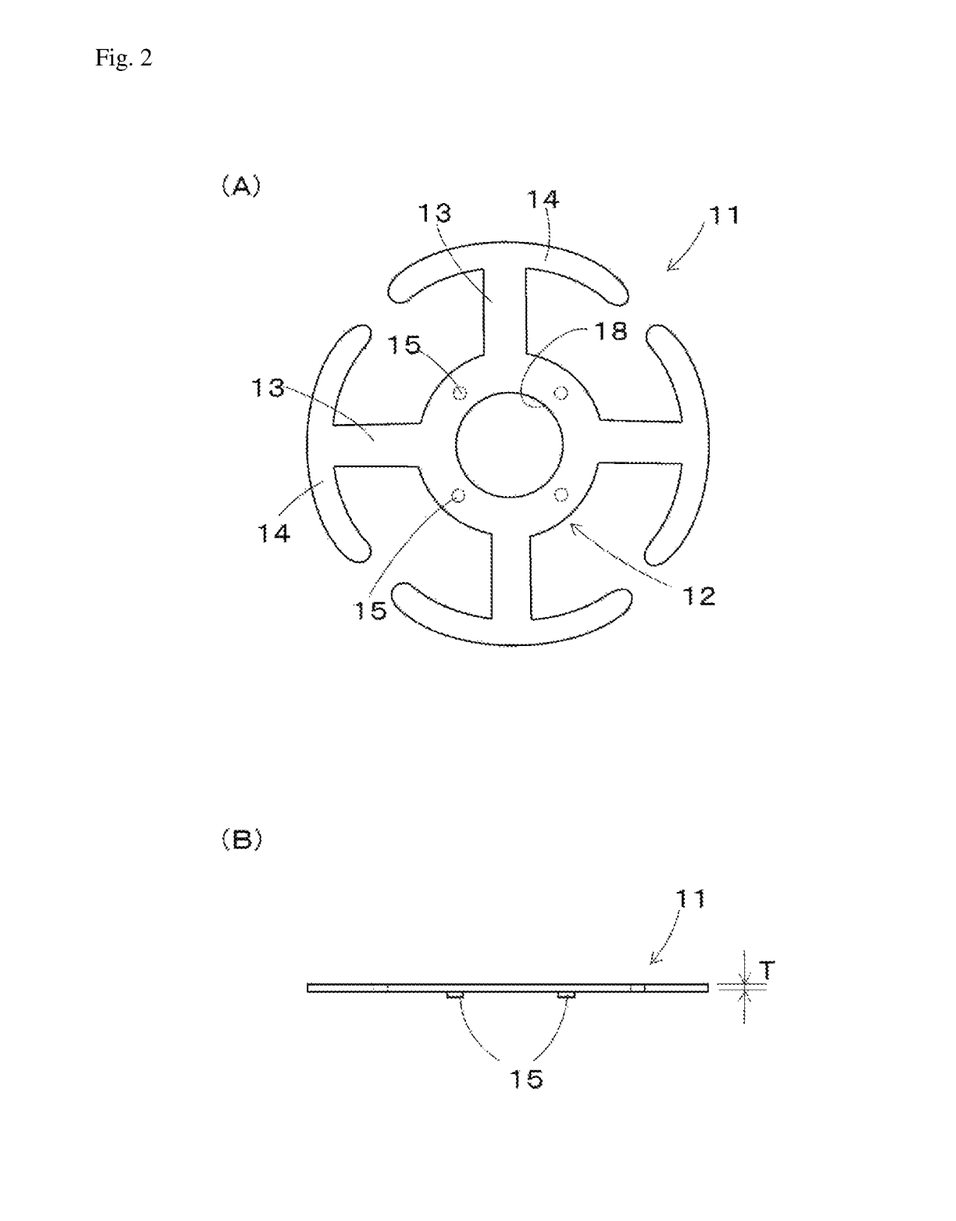
FIGS. 2A and 2B are a plan view and a side view of a core piece corresponding to the manufacturing method of the laminated core, respectively.

The core piece 11 is a thin plate material died from an electrical steel strip, and as shown in FIGS. 2A and 2B, a ring-shaped central annular portion 12 is provided at the center, and a plurality of teeth 13 are arranged radially around the central annular portion 12. A magnetic pole portion 14 elongated in the circumferential direction is connected to each of the teeth 13.

The core piece 11 has a thickness T of from 25 to 200 μm, and is overlapped with another core piece 11 in a die and temporarily fixed. The term "temporary fixation" means fixation of the core piece 11 in the die, and fixation of each core piece 11 performed afterward outside the die is referred to as "full fixation".

In the present embodiment, the core pieces 11 are temporarily fixed by caulking, and a caulking portion 15 formed at the time of caulking is provided on the core piece 11 at a non-extension region of the tooth 13 in the central annular portion 12 (or a region not on an extension of the tooth 13 which is long in the radial direction).

In general, in the inner core, a caulked portion tends to lower the magnetic characteristics of the inner core, and this tendency becomes prominent when the caulking portion is provided in a region where the magnetic flux density is high. Since similarly to a general core piece, in the central annular portion 12 of the core piece 11, the magnetic flux density of a region not on an extension of the tooth 13 is lower than that of an extension region of the tooth 13, the core piece 11 is designed to contribute to improvement of the magnetic characteristics of the inner core 10.

Next, a method of manufacturing the first laminated core will be described.

Figure 3:
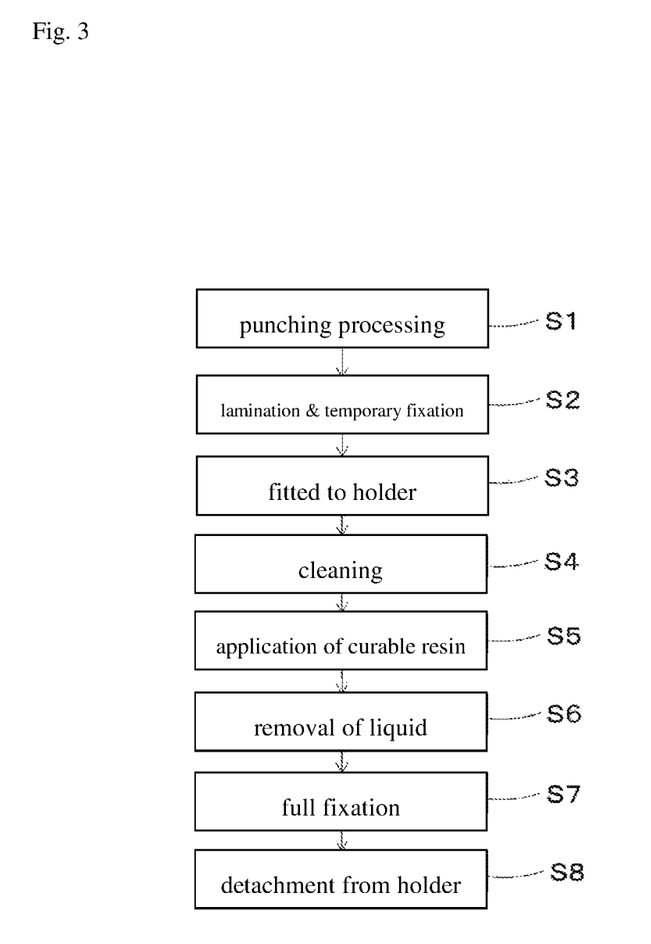
FIG. 3 is a flow chart of a manufacturing method of the laminated core.

In manufacturing the inner core 10, as shown in FIG. 3, first, a step S1 of punching a core piece 11 having a predetermined shape with a die from an electrical steel strip is performed, then, in a step S2 (step A), a plurality of died core pieces 11 are laminated in a die, and each of the core pieces is temporarily fixed to another core piece 11 by caulking. A group of core pieces 11 in which a predetermined number of core pieces 11 are laminated and temporarily fixed is hereinafter referred to as a core piece group 16 (see FIG. 4).

Temporary fixation of each core piece may be performed by applying an adhesive (for example, so-called instantaneous adhesive) to the core piece in a die and adhering core pieces instead of by caulking. In the core piece group 16 shown in FIG. 4, description of the caulking portion 15 is omitted.

Figure 4:
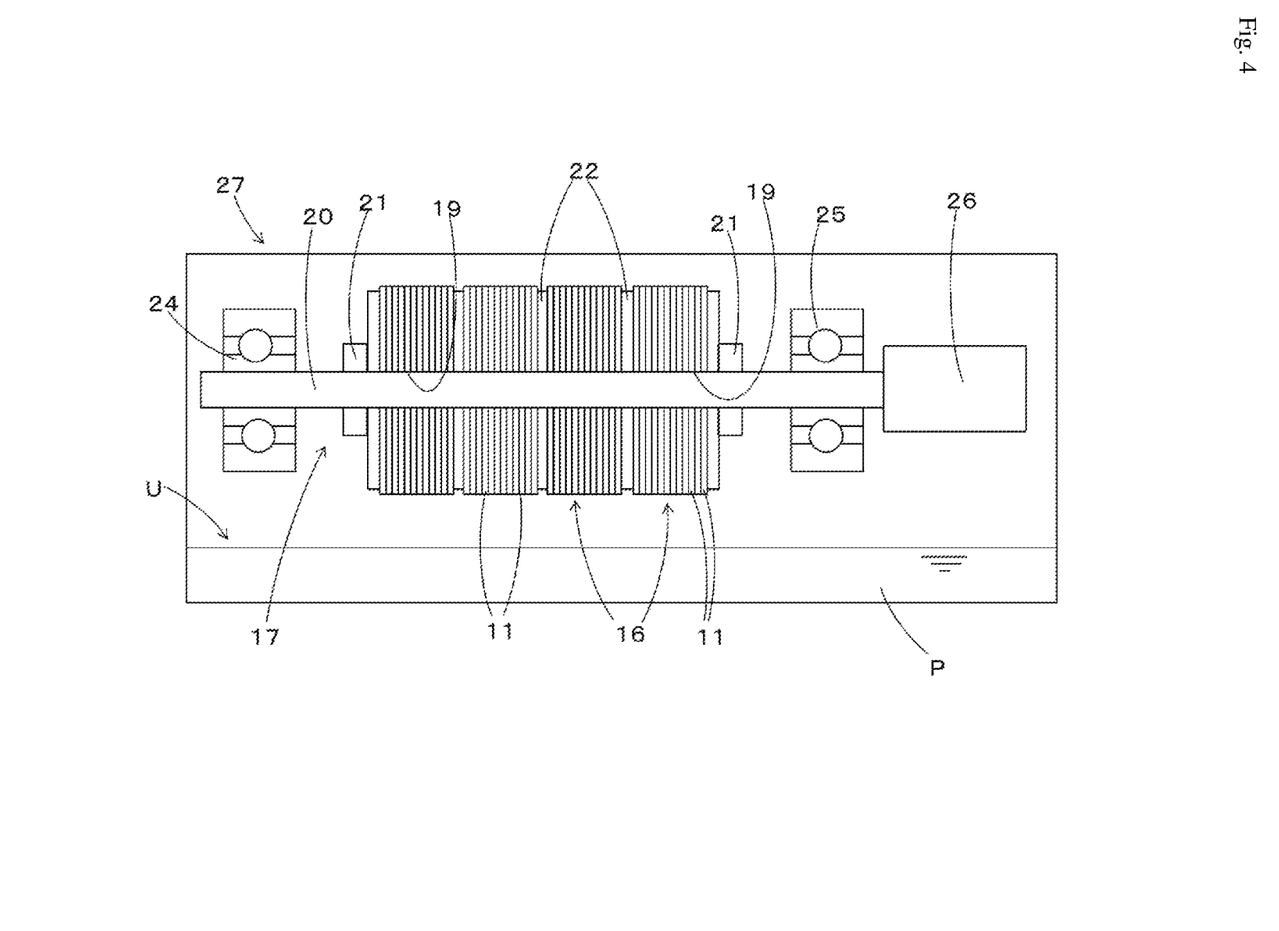
FIG. 4 is an explanatory view showing a state in which a core piece group is not immersed in a resin reservoir of a curable resin.

As shown in FIG. 3, the core piece group 16 obtained in the step S2 is fitted to a holder 17 shown in FIG. 4 outside a die or in a die in a step S3 (step B).

In the core piece group 16, as shown in FIG. 4, a through hole 19 formed by a series of center holes 18 is provided along the axial center of the core piece group 16, each of the center holes 18 being formed inside the central annular portion 12 of each core piece 11 as shown in FIG. 2A.

The holder 17 includes a bar-shaped holding member 20 and two clamping tools 21 fitted to the holding member 20. The core piece group 16 is fitted to the holder 17 in a state in which the holding member 20 is inserted through the through hole 19. Accordingly, the holding member 20 penetrates through the axial center of the core piece group 16. The holding member need not be rod-shaped.

In the present embodiment, the clamping tool 21 is a nut, and the holding member 20 is formed with a screw region in which the clamping tool 21 is engaged, and a fixing member is mainly constituted by two clamping tools 21.

In the holder 17, a plurality of core piece groups 16 are arranged coaxially and fitted to the holding member 20 in a state in which spacers 22 are arranged between adjacent core piece groups 16. The spacer 22 has a shorter diameter than the core piece 11, and is formed of a material different from that of the core piece 11.

Two clamping tools 21 fitted to the holding member 20 presses the core piece group 16 on one end of a plurality of core piece groups 16 fitted to the holder 17 and the core piece group 16 on the other end thereof toward the center of the holding member 20, and clamps the plurality of core piece groups 16 from both sides thereof. By clamping the plurality of core piece groups 16 from both sides by the two clamping tools 21, it is possible to stably secure a state in which each core piece group 16 has a predetermined thickness.

In the plurality of core piece groups 16 fitted on the holder 17, press oil is attached to each core piece 11. Therefore, as shown in FIG. 3, after the step S3, a cleaning step S4 of removing the press oil attached is performed on the radially outer side (the outer peripheral region of the core piece group 16) of each core piece 11. In the step S4, the holding member 20 is fitted on both sides to bearing members (not shown), the plurality of core piece groups 16 fitted to the holder 17 are lowered from above a cleaning liquid contained in a container together with the holder 17 and the bearing member with which the holding material 20 is held horizontally.

Then, the core piece group 16, the holder 17, and the bearing member are held at a predetermined height position where a part of the outer peripheral region of each core piece group 16 (in the present embodiment, substantially half the region from the radially outer side of one magnetic pole portion 14 of each core piece 11) is immersed in the cleaning liquid. At this time, the holding member 20 and the bearing member are in positions where they do not touch the cleaning liquid. Then, with the part of the outer peripheral region of the core piece group 16 immersed in the cleaning liquid, the holding member 20 is rotated, and the core piece group 16 is rotated about the axial center intermittently or continuously. A motor (not shown) is used for rotating the holding member 20.

By immersing the radially outer half of each magnetic pole portion 14 of the core piece group 16 in a cleaning liquid, the cleaning liquid enters into the central annular portion 12 of the core piece 11 in each magnetic pole portion 14 where the closely spaced core pieces 11 are stacked by the capillary phenomenon. Therefore, by rotating the core piece group 16 by 360° around the axial center, the cleaning liquid is applied to the entire outer peripheral region of the core piece group 16 (all magnetic pole portions 14 of each core piece 11).

After washing the outer peripheral region of the core piece group 16 with the cleaning liquid, the holder 17 is detached from the container containing the cleaning liquid, and the bearing member is detached from the holder 17.

After the step S4, as shown in FIG. 3, application of the uncured curable resin to the outer peripheral region of the core piece group 16 is performed in a step S5 (step C). Therefore, the outer peripheral region of the core piece group 16 is a region of the core piece group 16 to which a curable resin P is applied, and cleaning of the outer peripheral region of the core piece group 16 is performed between the step S3 and the step S5.

In the step S5, as shown in FIG. 4, bearing members 24 and 25 are respectively fitted to both sides of the holding member 20 of the holder 17 to which a plurality of core piece groups 16 are fitted, and a motor 26 (output shaft which is not illustrated of the motor 26) is connected to one end of the holding member 20.

The core piece groups 16 fitted to the holder 17 is placed in a container 27 containing the uncured curable resin P together with the holder 17, the bearing members 24 and 25, and the motor 26. On the lower side in the container 27, there is a resin reservoir U in which the uncured curable resin P is stored, and the core piece groups 16, the horizontally arranged holder 17, the bearing members 24, 25 and the motor 26 are lowered from above the resin reservoir U. In the present embodiment, the curable resin P is a thermosetting resin, but is not limited thereto.

Figure 5:
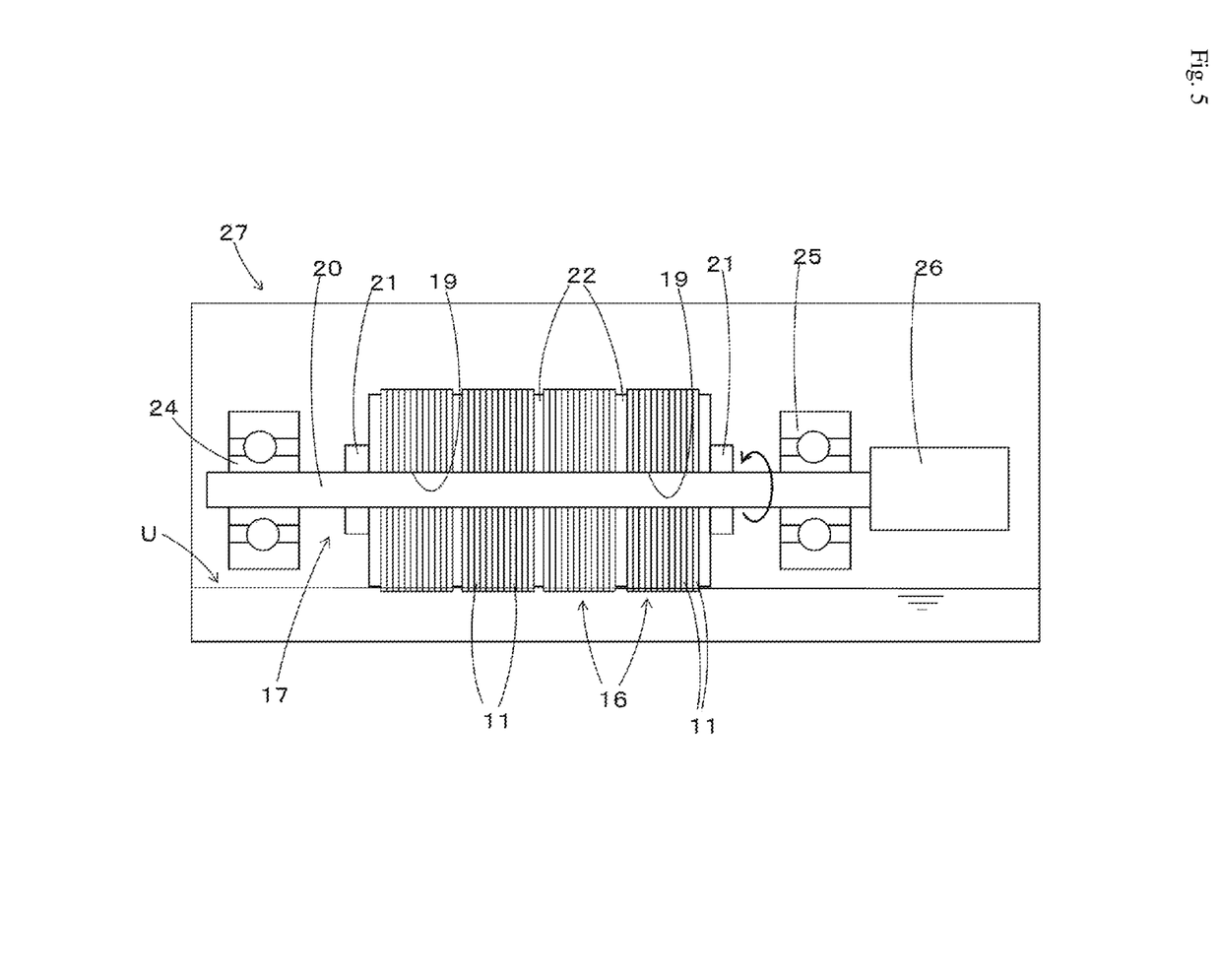
FIG. 5 is an explanatory view showing a manner in which a curable resin is applied to an outer peripheral region of a core piece group.

As shown in FIG. 5, lowering of the core piece group 16 is stopped at a predetermined height position where a part of the outer peripheral region of the core piece group 16 (in the present embodiment, approximately half the region from the radially outer side of one magnetic pole portion 14 of each core piece 11, but is not limited thereto) is immersed in the resin reservoir U in the core piece group 16. In the present embodiment, in order to avoid application of the curable resin P to the spacer 22, the spacer 22 stops the core piece group 16 at the height position without contact with the resin reservoir U. Depending on the material of the spacer 22 (for example, fluororesin) or subsequent processing, the spacer 22 may be brought into contact with the resin reservoir U.

The core piece group 16 maintains a state in which a support member which is not illustrated provided in the container 27 is disposed at a predetermined height position by supporting the holder 17, the bearing members 24 and 25, and the motor 26. At this time, the holder 17, the bearing members 24, 25, and the motor 26 are disposed at a height not touching the resin reservoir U.

After that, by the operation of the motor 26, the core piece group 16 together with the holder 17 is intermittently or continuously rotated around the axial center, and the curable resin P is applied sequentially (in this embodiment, sequentially to the plurality of magnetic pole portions 14 in each core piece 11) of the outer peripheral region of the core piece group 16. When the core piece group 16 is rotated, the holder 17 (including the holding member 20), the bearing members 24 and 25, the motor 26, and the spacer 22 are not immersed in the resin reservoir U.

In the core piece group 16, by dipping the radially outer half of each magnetic pole portion 14 in the curable resin P, the curable resin P enters toward the central annular portion 12 of the core piece 11 by capillary phenomenon in each of the magnetic pole portions 14 where the closely spaced core pieces 11 are stacked. Since the outer peripheral region of the core piece group 16 is cleaned, a sufficient wettability is ensured due to the capillary phenomenon between the stacked magnetic pole portions 14, and the curable resin P can stably enter into the stacked magnetic pole portion 14. It is also possible to suppress the curing resin P entering in the magnetic pole portion 14 from being diluted by press oil.

The rotational speed of the core piece group 16 is adjusted to a level at which the curable resin P enters from the radially outer side of the magnetic pole portion 14 to a position at a distance L. In the present embodiment, the distance L is a value of from 10 to 50% of the radial length (the length from the center to the outer side in the radial direction of the magnetic pole portion) of the core piece 11, and the value of the distance L is not limited thereto.

In the present embodiment, by rotating the core piece group 16 by 360° around the axial center, the curable resin P attaches to the entire magnetic pole portion 14 (the outer peripheral region of each core piece group 16).

After the curable resin P attaches to all the magnetic pole portions 14, the motor 26 is stopped, each core piece group 16, a holder 17, the bearing members 24, 25, and the motor 26 are elevated to a height position where the core piece group 16 is not in contact with the resin reservoir U and is entirely contained in the container 27, and stop as shown in FIG. 4.

Then, the motor 26 is operated again to rotate the core piece groups 16, and the excess curable resin P (a part of the curable resin P) attached to the core piece group 16 is removed by a centrifugal force (a step S6). The curable resin P removed from each core piece group 16 is scattered in the container 27 and is collected in the resin reservoir U through the side wall of the container 27.

After the step S6, the bearing members 24 and 25 and the motor 26 are removed from the holder 17 to which the plurality of core piece groups 16 are fitted, and a step S7 (step D) shown in FIG. 3 is performed in which the core piece group 16 is heated together with the holder 17 in a heating furnace.

By this heat treatment, the curable resin P applied to the core piece group 16 is cured, and the inner core 10 shown in FIGS. 1A and 1B in which each core piece 11 is fully fixed to the other core piece 11 is obtained.

After the core piece 11 is fully fixed to the other core piece 11, the clamping tool 21 is detached from the holding member 20, and the step S8 shown in FIG. 3 for detaching the plurality of inner cores 10 from the holding member 20 is performed.

Here, since the spacer 22 is not a material strongly adhered to the core piece 11 by curing of the curable resin P, the inner core 10 and the spacer 22 can be easily separated even when the curable resin P is attached between the spacer 22 and the inner core 10.

In the inner core 10, each core piece 11 is adhered to the other core piece 11 by the curable resin P in the entirety of each of all of the magnetic pole portions 14 as shown in FIG. 1A. In the central annular portion 12 and the teeth 13, a region N in which the cured curable resin P does not exist (or a region in which the curable resin P is absent inside in the radial direction) is provided. In the present embodiment, the entirety of each magnetic pole portion 14 corresponds to the radially outer side, but the present invention is not limited thereto, and for example, the radial outer half of each magnetic pole portion 14 may be the radially outer side. The region N in which the radially inner curable resin P is absent is not limited to a partial region of the central annular part 12, and may be the entire of the central annular part 12, for example.

Next, a method of manufacturing a laminated core according to a second embodiment of the present invention (hereinafter, also referred to as "second method of manufacturing a laminated core") will be described. Since the second method of manufacturing a laminated core differs from the first method of manufacturing a laminated core mainly at step S5, only step S5 will be described below.

Figure 6:
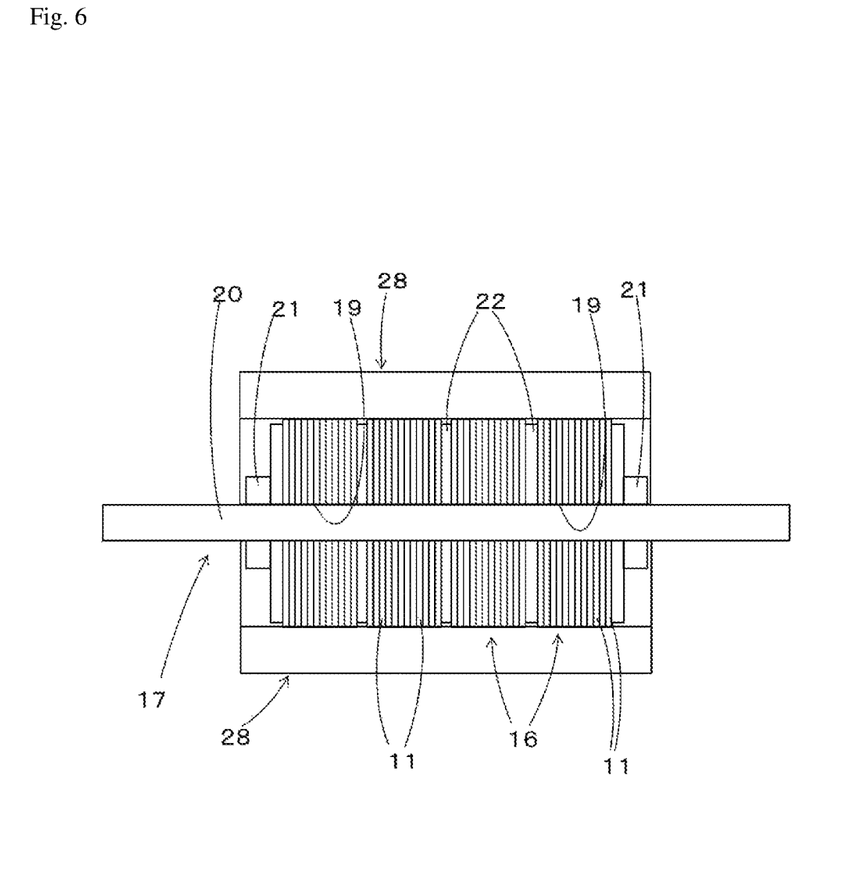
FIG. 6 is an explanatory view showing a manner in which a curable resin is applied to an outer peripheral region of a core piece group in the method of manufacturing a laminated core according to a second embodiment of the present invention.

In the second method of manufacturing a laminated core, in the step S5, as shown in FIG. 6, a plurality of absorbent bodies 28 (an example of a resin-attached body to which an uncured curable resin P is impregnated) impregnated with an uncured curable resin P is brought into contact with the entire outer peripheral region of the plurality of core piece groups 16 fitted to the holder 17, and an uncured curable resin P is applied to the outer peripheral region of the core piece group 16.

As the absorbent body 28, sponge, nonwoven fabric, porous rubber, or the like can be adopted. Instead of the absorbent body 28, a brush (an example of a resin-attached body) with an uncured curable resin P may be used.

In the second method of manufacturing a laminated core, application of the uncured curable resin P is performed by bringing the resin-attached body close to the stationary core piece group 16 and bringing the body into contact with the outer peripheral region of the core piece group 16, but it is needless to say that the application is not limited thereto.

The curable resin may be applied by spraying the uncured curable resin P blown out from a nozzle which is not illustrated to the outer peripheral region of the core piece group 16.

Figure 7:
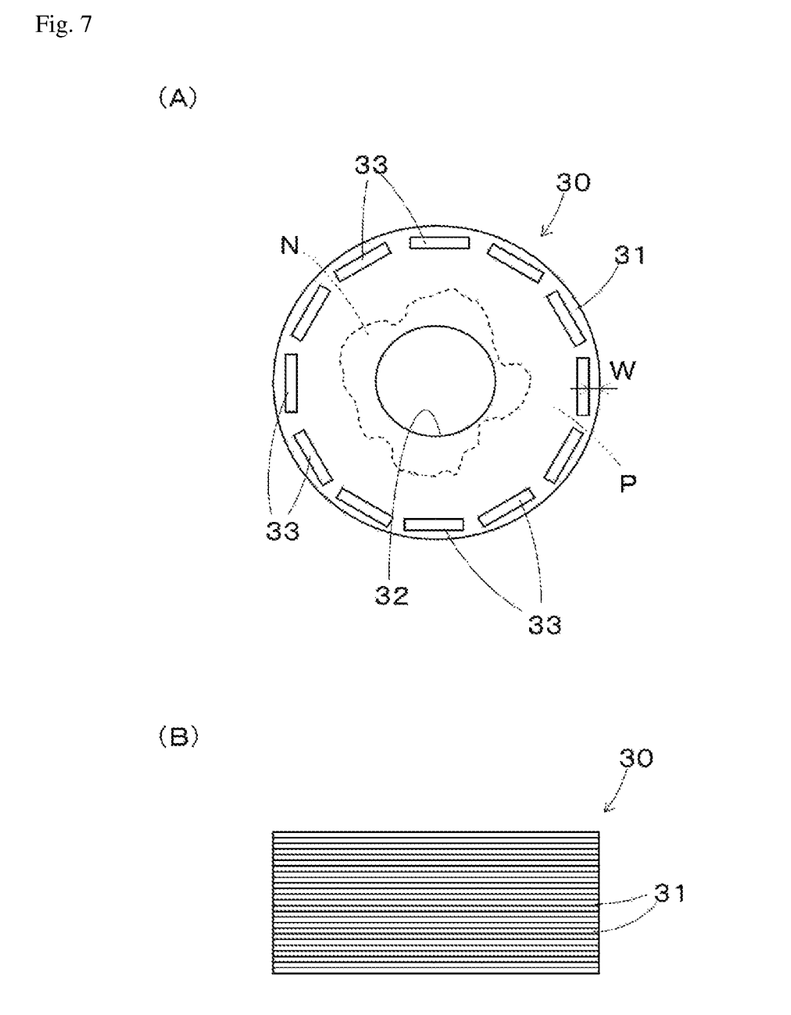
FIGS. 7A and 7B are a plan view and a side view of an inner core manufactured by the method of manufacturing a laminated core according to the first and second embodiments of the present invention, respectively.

The method of manufacturing a laminated core according to the first or second embodiment is also applicable to an inner rotor (an inter core as a rotor) 30 shown in FIGS. 7A and 7B. It is noted that adjustment such as adopting a die and a holder according to the shape of the inner rotor 30 is required.

As shown in FIGS. 7A and 7B, the inner rotor 30 is formed by laminating a plurality of core pieces 31, a through hole 32 is provided in the center, and a plurality of magnet insertion holes 33 are formed along the circumferential direction on the radially outer side. The core pieces 31 are adhered to each other at the outside in the radial direction by a curable resin P, and a region N in which the curable resin P does not exist radially inside is provided between the core pieces 31. Although each core piece 31 is temporarily fixed by caulking, the description of a caulking portion is omitted in FIGS. 7A and 7B.

The core piece 31 has a thickness of from 25 to 200 μm, and the inner rotor 30 has a distance W from each magnet insertion hole 33 to the outer periphery of from 0.05 to 0.4 µm. Since the motor efficiency improves as the distance from the magnet insertion hole to the outer periphery is short (each magnet insertion hole is near the outer periphery), from the viewpoint of improving the motor efficiency, it is preferable to shorten the distance from the magnet insertion hole to the outer periphery.

However, when the distance from the magnet insertion hole to the outer periphery is too short, deformation beyond an allowable range occurs in the vicinity of the magnet insertion hole on the radially outer side of the inner rotor due to a force acting on a steel strip when punching out the inner rotor from the steel strip.

A force acting on a steel plate when punching the inner rotor decreases as the core piece becomes thinner. Therefore, in order to shorten the distance from the magnet insertion hole to the outer periphery, it is effective to thin each core piece. Since the thickness of the core piece 31 is as thin as from 25 to 200 µm, the distance W can be shortened to from 0.05 to 0.4 µm. From the viewpoint of shortening the distance from the magnet insertion hole to the outer periphery, it is preferable that the core piece 31 has a thickness of from 25 to 150 µm and the distance W is from 0.05 to 0.2 µm.

Next, an outer core 40 as a stator shown in FIGS. 8A and 8B and a method of manufacturing a laminated core according to a third embodiment of the present invention for producing the outer core 40 (hereinafter, also referred to as "third method of manufacturing a laminated core") will be described.

Figure 8:
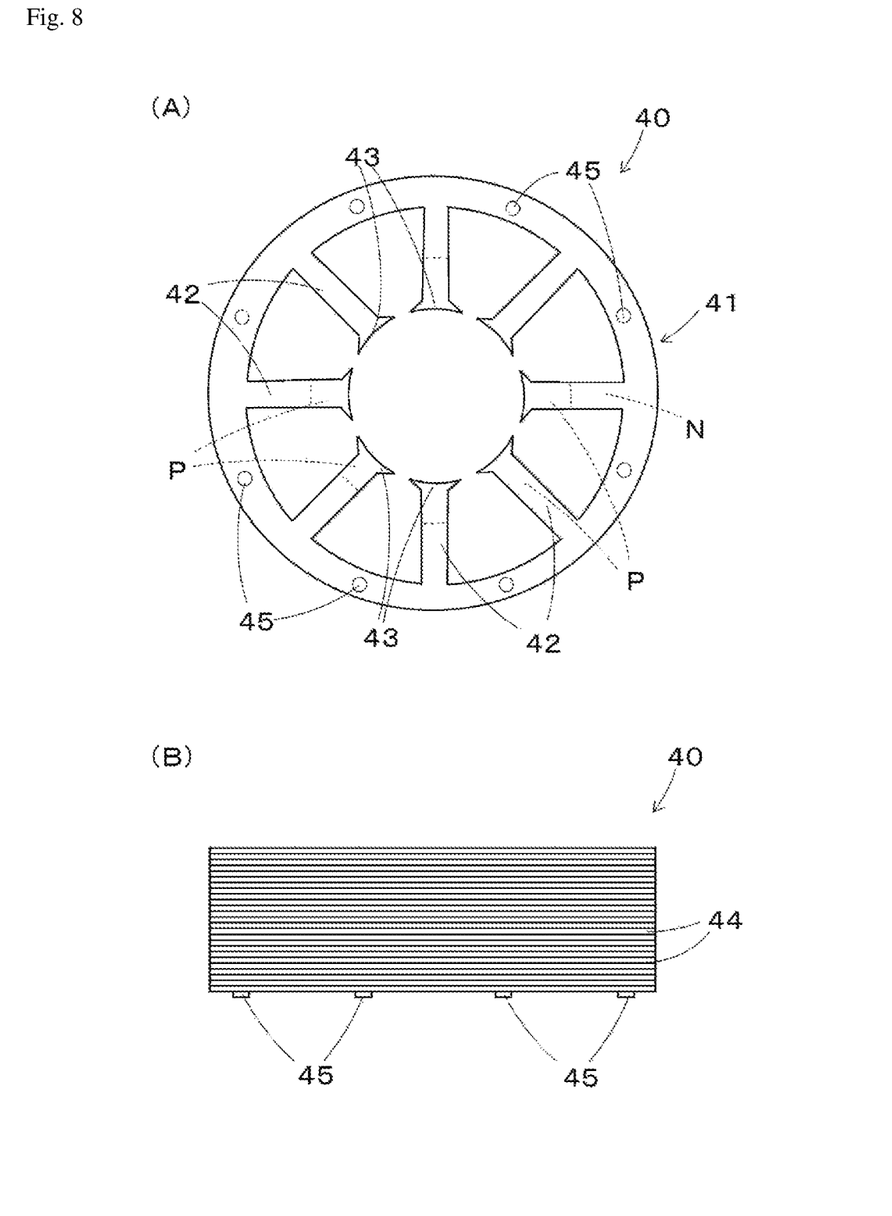
FIGS. 8A and 8B are a plan view and a side view of an outer core manufactured by the method of manufacturing a laminated core according to the third embodiment of the present invention, respectively.

As shown in FIGS. 8A and 8B, the outer core 40 is formed by laminating core pieces 44 each including an annular base portion 41 arranged on the outer periphery thereof, a plurality of teeth 42 each of which is long in the radial direction, and a magnetic pole portion 43 continuously formed radially inward of each tooth 42. The core piece 44 has a thickness of from 25 to 200 µm (preferably from 25 to 150 µm).

The third method of manufacturing a laminated core differs from the second method of manufacturing a laminated core in a die that punches core piece 44 from a steel strip, the shape of a holder for fitting a core piece group obtained by laminating core pieces 44 and temporarily fixing the pieces, and the like, but the methods have many points in common.

Similarly to the first and second methods of manufacturing a laminated core, the third method of manufacturing a laminated core includes a step E of obtaining a core piece group by laminating a plurality of core pieces 44 in a die and temporarily fixing each core piece to another core piece 44, a step F of fitting the core piece group to a holder F, a step G of applying an uncured curable resin P to each magnetic pole portion 43 (inner peripheral region) of the core piece group G, and a step H of curing the curable resin P applied to the core piece group and fully fixing each core piece 44 to another core piece 44.

Therefore, the uncured curable resin P is applied to the inner peripheral region of the core piece group. Specific examples of a method of applying the uncured curable resin P include application by contacting a resin-attached body having the uncured curable resin P on the inner peripheral region of the core piece group, and application by spraying the uncured curable resin P blown out from a nozzle onto the inner peripheral region of the core piece group.

Therefore, in the outer core 40, as shown in FIG. 8A, each magnetic pole portion 43 and each tooth 42 in the radial direction is adhered to another core piece 44 by the curable resin P on each of both sides of each core piece 44, and the cured curable resin P does not exist in the annular base portion 41 and the radially outside of each tooth 42 (in other words, a region N in which the cured curable resin P is absent is provided on the outer side in the radial direction).

In the outer core 40, a caulking portion 45 is provided in a non-extension region of each of the teeth 42 of the annular base portion 41.

Figure 9:
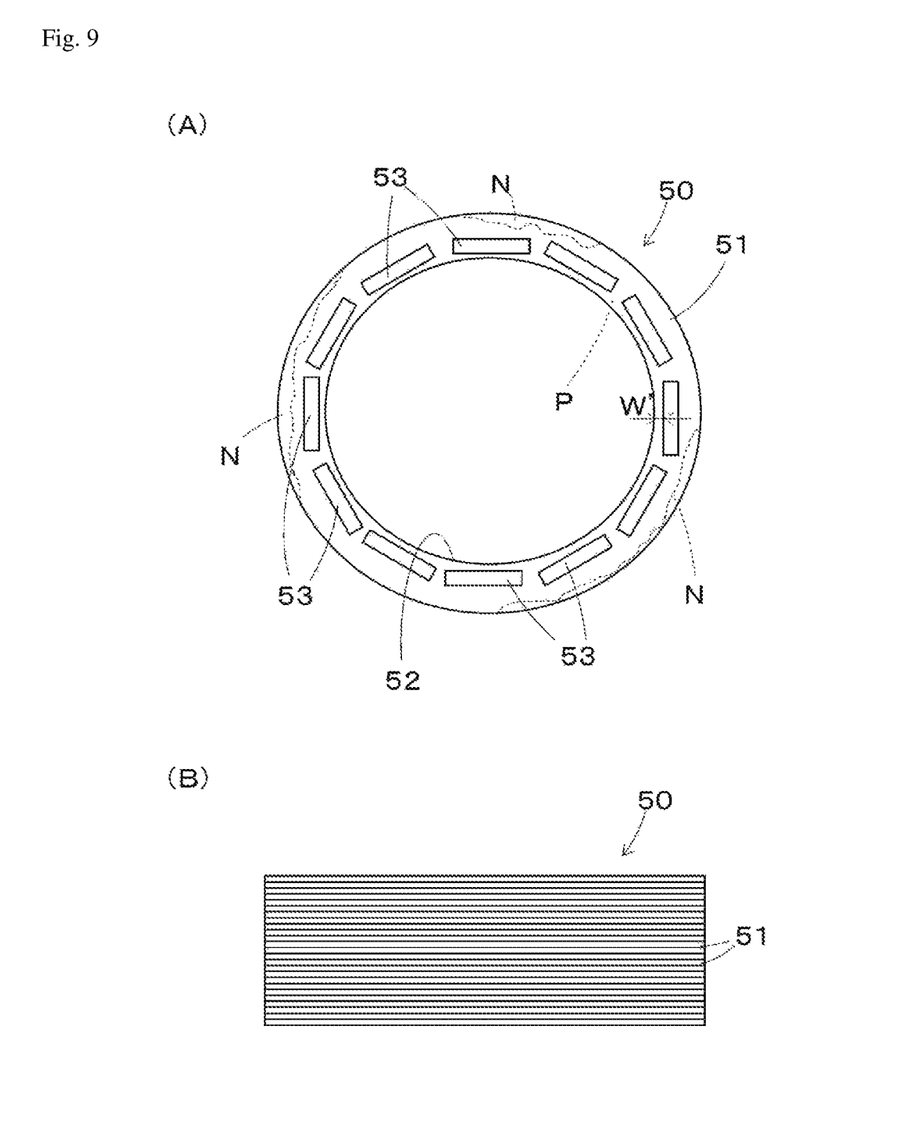
FIGS. 9A and 9B are a plan view and a side view of an outer core manufactured by the method of manufacturing the laminated core, respectively.

The third method of manufacturing a laminated core can also be applied to a outer rotor (an outer core of a rotor) 50 shown in FIGS. 9A and 9B. However, adjustment such as adopting a die and a holder according to the shape of the outer rotor 50 is required.

As shown in FIGS. 9A and 9B, the outer rotor 50 is formed by laminating a plurality of core pieces 51, is formed annularly with a through hole 52 in the center, and has a plurality of magnet insertion holes 53 formed along the circumferential direction on the radially inner side. The radially inner portions of the core pieces 51 are adhered by the curable resin P, and a region N in which the curable resin P does not exist radially outward is provided between the core pieces 51. Although the core pieces 51 are temporarily fixed by caulking, descriptions of caulking portions are omitted in FIGS. 9A and 9B.

The core piece 51 has a thickness of from 25 to 200 µm, and the outer rotor 50 has a distance W' from each magnet insertion hole 53 to the outer periphery of from 0.05 to 0.4 µm.

Since the thickness of the core piece 51 is as thin as from 25 to 200 µm, the distance W' can be shortened to from 0.05 to 0.4 µm. From the viewpoint of shortening the distance from the magnet insertion hole to the outer periphery, it is preferable that the core piece 51 has a thickness of from 25 to 150 µm and the distance W' is from 0.05 to 0.2 µm.

Although the embodiments of the present invention have been described above, the present invention is not limited to the above-described embodiments, and all modifications of conditions and the like that do not depart from the gist are all within the scope of the present invention.

For example, the holder need not be provided with a holding member inserted through the through hole of the core piece group.

It is not necessary to fit a plurality of core piece groups to one holder, and only one core piece group may be fitted to one holder. When a plurality of core piece groups are to be fitted on one holder, adjacent core piece groups may be made non-contact by using a member other than a spacer.

Furthermore, a step of cleaning the core piece group is not necessarily required.

A bearing member to be fitted to the holding member of the holder and a motor connected to the holding member of the holder may be arranged in advance in the container containing the uncured curable resin.

A process of removing a part of the curable resin applied to the outer peripheral region of the core piece group is not necessarily required.

Further, the core piece is not limited to one punched out from an electrical steel strip, and may be one punched out from a steel plate of another material. It is not limited that one core piece constitutes one layer of the inner core or the outer core, and a plurality of core pieces may constitute one layer of the inner core or the outer core.

In a stator core used for a motor of an outer rotor, a caulking portion may be provided in an extension region of a tooth in a central annular portion or on the tooth itself, and in a stator core used for a motor of an inner rotor, a caulking portion may be provided in an extension region of a tooth in an annular base portion or on the tooth itself.

DESCRIPTION OF SYMBOLS

10: inner core, 11: core piece, 12: central annular portion, 13: tooth, 14: magnetic pole portion, 15: caulking portion, 16: core piece group, 17: holder, 18: center hole, 19: through hole, 20: holding member, 21: clamping tool, 22: spacer, 24, 25: bearing member, 26: motor, 27: container, 28: absorbent body, 30: inner rotor, 31: core piece, 32: through hole, 33: magnet insertion hole, 40: outer core, 41: annular base portion, 42: tooth, 43: magnetic pole portion, 44: core piece, 45: caulking portion, 50: outer rotor, 51: core piece, 52: through hole, 53: magnet insertion hole, P: curable resin, U: resin reservoir, N: region

The invention claimed is:

1. A method of manufacturing a laminated inner rotor core or inner stator core, comprising:
   a step A of laminating a plurality of core pieces of an inner rotor core or inner stator core and temporarily fixing each of the core pieces to another core piece to obtain a core piece group;
   a step B of fitting, in a state in which an axial center of the core piece group is penetrated by a holding member of a holder, the core piece group to the holder;
   a step C of applying, in a state in which a part of an outer peripheral region of the core piece group is immersed in a resin reservoir containing an uncured curable resin, the uncured curable resin to the outer peripheral region at which the curable resin enters from the outer peripheral region to a position at a distance of 10% or more of a radial length of the core piece by rotating the holding member to rotate the core piece group around the axial center; and
   a step D of curing the curable resin applied to the core piece group of the inner rotor core or inner stator core and fully fixing each of the core pieces to another core piece.

2. The method of manufacturing a laminated inner rotor core or inner stator core according to claim 1, wherein rotation of the core piece group in the step C is performed in a state in which the holding member is not immersed in the resin reservoir.

3. The method of manufacturing a laminated inner rotor core or inner stator core according to claim 1, wherein before the step D, a part of the curable resin applied to the core piece group is removed by rotating the core piece group.

4. The method of manufacturing a laminated inner rotor core or inner stator core according to claim 1, wherein a region of the core piece group on which the curable resin is to be applied is cleaned in an intervening period between the steps B and C.

5. The method of manufacturing a laminated inner rotor core or inner stator core according to claim 1, wherein a plurality of the core piece groups is fitted to the holder in a state in which the core piece groups are arranged coaxially with spacers arranged between adjacent core piece groups.

6. The method of manufacturing a laminated inner rotor core or inner stator core according to claim 5, wherein the holder includes a fixing member that clamps the plurality of core piece groups fitted to the holder from both sides.

7. The method of manufacturing a laminated inner rotor core or inner stator core according to claim 1, wherein the curable resin the curable resin is a thermosetting resin.

8. The method of manufacturing a laminated inner rotor core or inner stator core according to claim 5, wherein rotation of the core piece groups in the step C is performed in a state in which the spacers are is not immersed in the resin reservoir.

9. The method of manufacturing a laminated inner rotor core or inner stator core according to claim 1, wherein the thickness of each core piece is 200 μm or less.

10. The method of manufacturing a laminated inner rotor core or inner stator core according to claim 1, wherein each core piece has a central annular portion and a plurality of teeth, and wherein the plurality of teeth are arranged radially around the central annular portion.

11. A method of manufacturing an inner rotor core or inner stator core, the method comprising:
   laminating a plurality of core pieces of an inner rotor core or inner stator core and temporarily fixing each of the core pieces to another core piece to obtain a core piece group;
   fitting, in a state in which an axial center of the core piece group is penetrated by a holding member of a holder, the core piece group to the holder;
   applying, in a state in which a part of an outer peripheral region of the core piece group is immersed in a resin reservoir containing a liquid consisting of an uncured curable resin, the uncured curable resin to the outer peripheral region by contacting a plurality of magnetic pole portions in each of the core pieces with the uncured curable resin by rotating the holding member to rotate the core piece group around the axial center; and
   curing the curable resin applied to the core piece group of the inner rotor core or inner stator core and fully fixing each of the core pieces to another core piece.

12. A method of manufacturing a laminated inner core, comprising:
   a step A of laminating a plurality of core pieces and temporarily fixing each of the core pieces to another core piece to obtain a core piece group;
   a step B of fitting, in a state in which an axial center of the core piece group is penetrated by a holding member of a holder, the core piece group to the holder;
   a step C of applying, in a state in which a part of an outer peripheral region of the core piece group is immersed in a resin reservoir containing an uncured curable resin, the uncured curable resin to the outer peripheral region by rotating the holding member to rotate the core piece group around the axial center; and
   a step D of curing the curable resin applied to the core piece group and fully fixing each of the core pieces to another core piece,
   wherein a plurality of the core piece groups is fitted to the holder in a state in which the core piece groups are arranged coaxially with spacers arranged between adjacent core piece groups, and
   wherein rotation of the core piece groups in the step C is performed in a state in which the spacers are not immersed in the resin reservoir.

* * * * *